United States Patent [19]

Lightfoot et al.

[11] Patent Number: 4,590,808
[45] Date of Patent: May 27, 1986

[54] METHOD AND APPARATUS FOR DETERMINING TENSION AND PRESSURE

[76] Inventors: Benjamin H. Lightfoot, 13515 Krestwood Dr., Burnsville, Minn. 55337; Harold W. Atkins, 7121 Tralee Dr., Edina, Minn. 55435

[21] Appl. No.: 644,219

[22] Filed: Aug. 24, 1984

[51] Int. Cl.[4] .............................................. G01L 5/10
[52] U.S. Cl. ................................... 73/862.48; 73/818
[58] Field of Search ................... 73/78, 81, 700, 789, 73/790, 818, 862.45, 862.47, 862.48

[56] References Cited

U.S. PATENT DOCUMENTS

| | | | |
|---|---|---|---|
| 1,630,110 | 5/1927 | Cole | 73/818 |
| 4,055,999 | 11/1977 | Cope | 73/862.47 |
| 4,245,512 | 1/1981 | Saunders | 73/789 |
| 4,313,289 | 2/1982 | Birdsong, Jr. | 73/818 X |

FOREIGN PATENT DOCUMENTS

| | | | |
|---|---|---|---|
| 0578424 | 11/1931 | Fed. Rep. of Germany | 73/789 |
| 2925857 | 1/1981 | Fed. Rep. of Germany | 73/700 |
| 0115338 | 5/1918 | United Kingdom | 73/862.47 |

*Primary Examiner*—Charles A. Ruehl
*Attorney, Agent, or Firm*—John W. Adams

[57] ABSTRACT

A device and method for determining a tension factor in grids such as tennis rackets and the like, which have different sized string areas, the device including a frame structure defining a fixed, predetermined test area within a larger size racket string area and having a mechanism for relating two measurement components, a deflection component and a force component, an element for applying a first measurement component to the grid test area and an element for sensing the other component resulting from the application of the first component, and determining from the two components a tension factor in the strings forming the grid, the method including defining a predetermined test area within a larger grid area, applying one of two measurement components to a portion of the grid test area, determining the other component resulting from the application of the one component to the grid test area, and determining a tension factor in the strings forming the grid from the values of the two components; the apparatus also including a mechanism and method for determining the compressibility of balls such as tennis balls.

11 Claims, 6 Drawing Figures

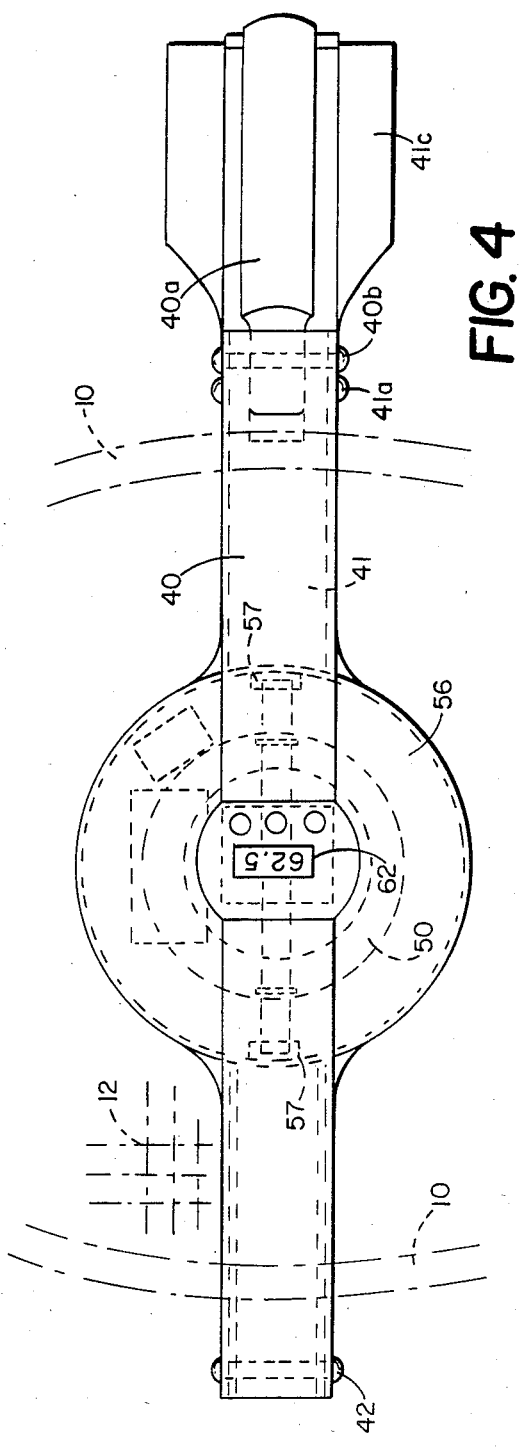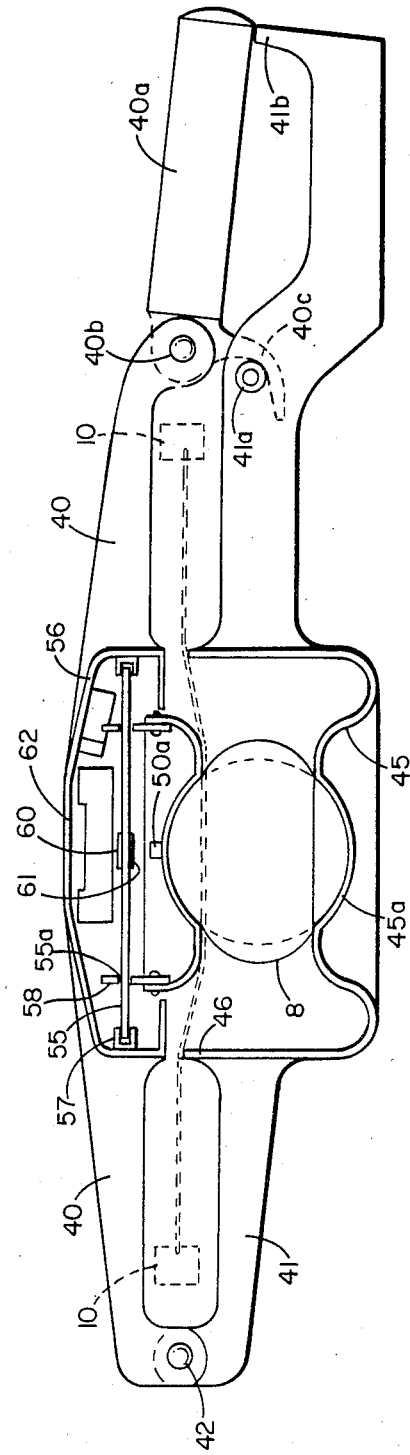

4,590,808

METHOD AND APPARATUS FOR DETERMINING TENSION AND PRESSURE

BACKGROUND OF THE INVENTION

In racket sports, it is important that the player be able to determine a tension factor of the strings in the racket.

Today, the only way to ensure that a racket has a specific tension is to restring the racket to the desired tension. As the racket is used, the strings stretch and the tension changes over a period of use. The tension may also change with changes in ambient temperature and humidity.

Obviously, different sports are played with rackets having different sized heads and also in recent years, the size of tennis racket heads has been varied so that there is no standard size for tennis rackets at the present time. This requires a measuring device which provides a uniform test area and can be quickly and easily applied to the face of rackets used in any racket sport to determine a tension factor in the strings.

Also, the compressibility of the game balls is very important to the players. The only way to determine the compressibility of balls is to squeeze them manually or bounce them such as is done frequently. Players customarily discard balls after relatively short intervals of play an open new balls to ensure that the balls have full specification internal pressure as well as a uniform condition of the outer cover surface, and thereby ensure uniform performance during play.

SUMMARY OF THE INVENTION

The present invention constitutes a device and method for determining at any time a string tension factor in rackets having different sized heads and the device including a frame structure adapted to be mounted in engagement with the strings of a racket head on one side thereof to define a test area of predetermined size. The device includes a deflecting element supported by said frame structure with means for moving the element to produce a deflection of the strings within the test area. The device also includes means for measuring the force exerted by the strings in a direction generally normal to the plane defined by the grid area wherein a strain gauge or other means of measuring force is used to determine the resistive force exerted by the strings after deflection thereof. This invention also includes the method of determining the string tension in a strung racket.

This invention also will determine the compressibility of tennis balls and other balls used in racquet sports such as racquetballs and squash balls. The deflecting element of the device is used to compress the ball placed in a test cup. The amount of force required to deflect the ball is measured by the device and a compressibility factor is then determined which can be related to the compressibility of a new, fully pressurized ball.

Different rackets have different string spacing so that calibration of the device to directly read out the tension of the individual strings would necessitate adjustment of the internal mechanism in accordance with the number of strings within the grid being measured. For this reason, it may be expedient to use the readout value produced by the device as an index which would permit the operator to obtain the actual individual string tension from a chart prepared to provide the string tension value in accordance with the string spacing of the racket being tested.

For purposes of this application, the string tension factor is defined as a representative number which may indicate the actual tension in the racket strings or may merely constitute a tension index number for evaluation by the operator, who could obtain the actual tension value from a chart prepared to provide this information in accordance with the index number obtained.

DESCRIPTION OF THE DRAWINGS

FIG. 4 is a top plan view of still another modification of a combination tension and ball pressure measuring device;

FIG. 5 is a central vertical sectional view of the structure shown in FIG. 4.

DETAILED DESCRIPTION OF THE PREFERRED EMBODIMENT

A tennis racket R is illustrated in the accompanying drawings and has a racket frame or head portion 10 forming the head thereof. Strings 12 are strung in a conventional criss-cross grid fashion within the area of the head 10 and each string has been strung to the tension desired by the player using the racket.

A device and method for determining the tension factor of the strings in a racket head immediately after stringing and at any subsequent point in time, form the subject matter of this invention.

Figure 1:
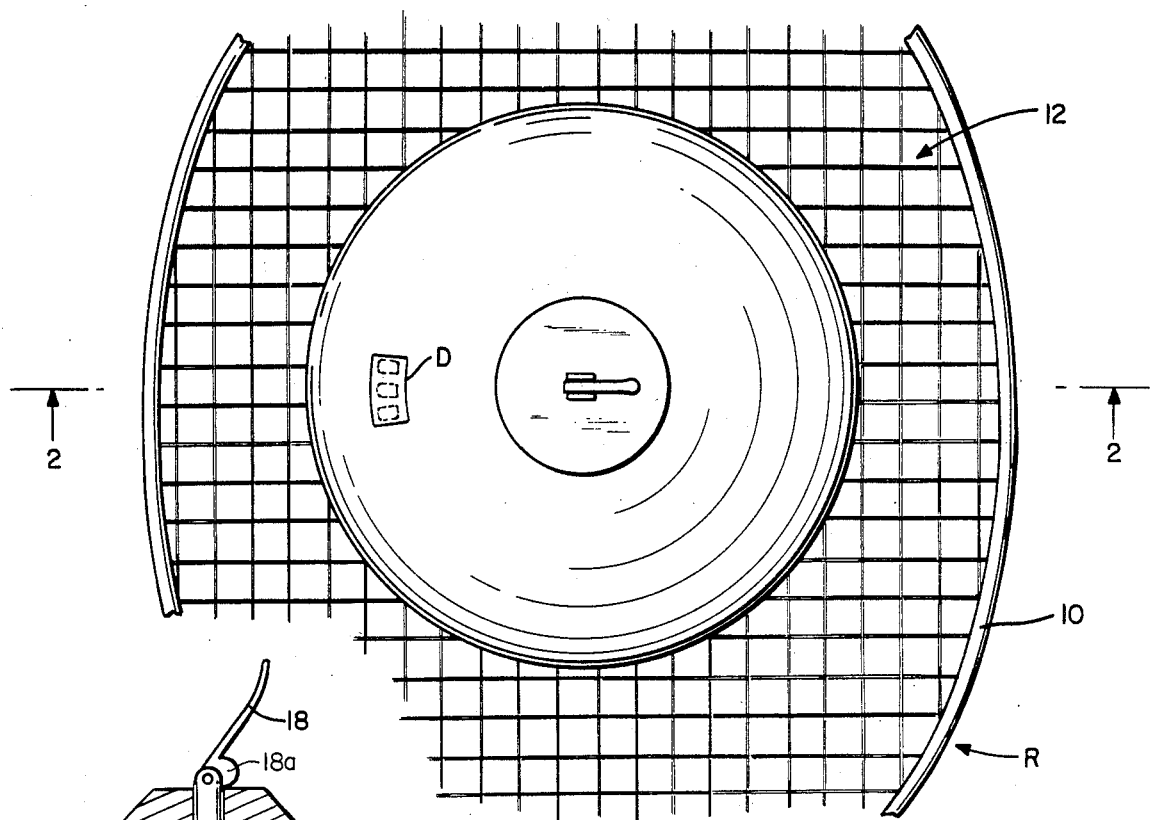
FIG. 1 is a top plan view of a tennis racket with one form of the tension-measuring device in operative position.

The device illustrated in FIG. 1 includes a frame structure or housing 15 which may be in the form of a conical shaped part as is illustrated. This frame structure 15 is designed to produce a generally circular peripheral string-engaging ring portion 15a which is suitably contoured to produce a smooth string-engaging edge to prevent damage to the strings when applied thereagainst. The ring 15a defines a generally circular test area A within the confines thereof.

A retraction spindle 17 is slidably mounted through the top 15b of the housing 15 and is provided with a retracting lever 18 pivotally mounted on the upper portion of the spindle 17, and having a deflecting cam 18a formed thereon for camming engagement with the top surface of the housing 15. The lower end of the spindle 17 has a central guideway to telescopically receive and guide the upper portion of a connecting rod 19. A removable string-engaging deflecting element 20 is connected at the bottom of the rod 19 as by screw threads 19a.

The lower portion of the connecting rod 19 immediately above the threaded portion 19a is provided with a shoulder against which the deflecting element 20 seats when attached to the rod 19 as by a nut fixed to the bottom of element 20. The portion of the connecting rod 19 immediately above the shoulder is reduced in size to pass through an opening in the gridwork of the racket strings 12, thus avoiding any damage to the strings but permitting the top of the deflecting element to engage the string when attached to the bottom of the rod 19.

In the form of the invention shown, a load cell designated as an entirety by the letters LC, is provided and includes a strain gauge assembly designated by the letter S. The strain gauge S includes a calibrated tension member such as the beam 25 which passes through a slot in a portion of the rod 19 disposed in spaced relation above the strings 12 of the racket. A connection between the retraction spindle 17 and the outer ends of the beam 25 is provided by a rigid yoke structure 26 having downwardly-extending tabs 26a on the ends thereof. The strain gauge beam 25 slidably extends through the tab elements 26a as illustrated to support the ends of the beam but permit the beam to flex with a substantially unrestricted action. Since the connecting rod 19 is mounted for axial sliding movement within the yoke structure 26, the beam 25 provides supporting connection between the retraction spindle 17 and the string-engaging deflecting element 20, so that when the lever 18 is swung downwardly into deflecting position the force exerted by the strings 12 through the deflecting element 20 is applied to the beam 25 of the strain gauge to cause deflection thereof in proportion to the tension in the strings 12.

This deflection is sensed by a pair of conventional strain gauge sensing elements 30 and 31 respectively fixed to the top and bottom of the beam as illustrated, which form a part of the load cell circuitry which, in turn, is connected to a suitable readout display D such as the digital unit illustrated.

Figure 3:
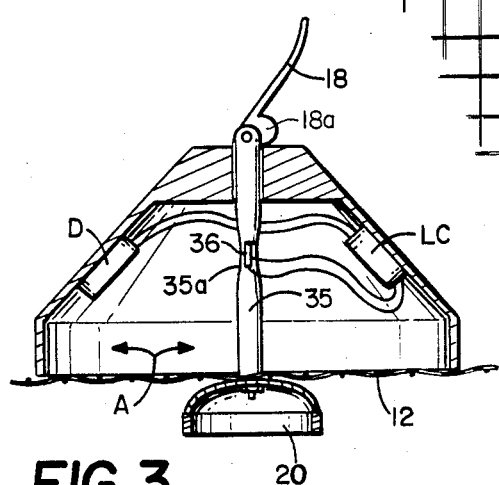
FIG. 3 is a vertical section of a modified tension-determining device.
Figure 2:
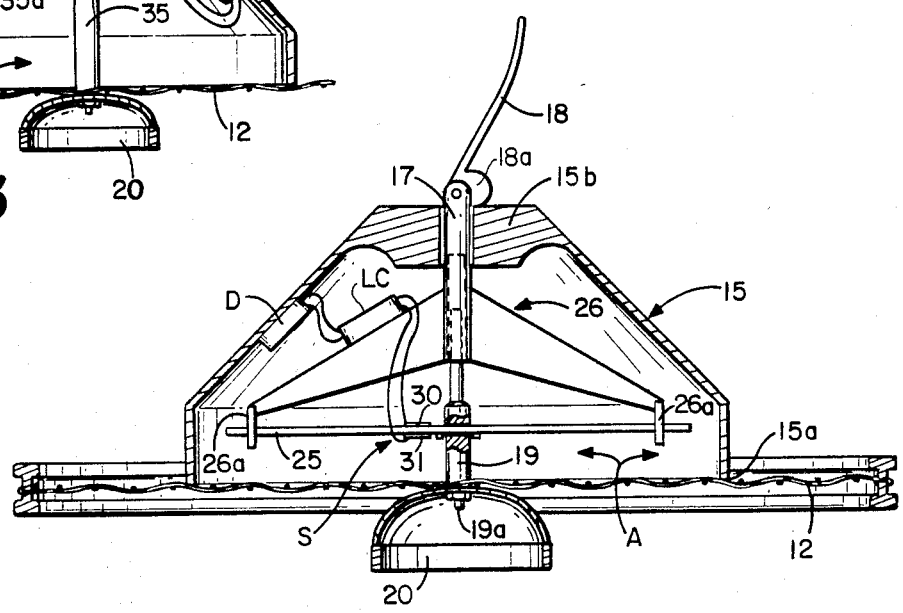
FIG. 2 is a vertical section through the structure shown in FIG. 1.

An alternative form of strain gauge may be provided such as is illustrated in FIG. 3 wherein a mounting spindle 35 is provided with an intermediate reduced cross section 35a specifically designed to produce a sufficient elongation under the stress produced by deflection of the strings 12 when the cam lever 18 is actuated to permit a direct tensile strain or elongation measurement on a strain gauge or other electronic load sensing element 36 applied to the reduced spindle area 35a. The load cell circuitry for both forms of the invention is of conventional design and is similar to that provided with the beam strain gauge construction previously disclosed herein.

Still another form of the invention is illustrated in FIGS. 4 and 5 which is designed with a pair of hinged clamping elements which span the racket head without requiring a central attachment spindle extending through the grid to attach the two supporting structures together on opposite sides of the grid. This form of the invention includes a pair of pivoted arms 40 and 41 hinged together on a hinge pin 42. In the form illustrated, the lower arm 41 is provided with a circular supporting base 45 which is integrally formed with a string-engaging, area-defining ring member 46 positioned at the upper end thereof.

The hinged lever arms 40 and 41 are designed to span across the racket head 10 which has the strings 12. The upper lever arm 40 has a handle 40a pivotally connected to the free end thereof by hinge pin 40b. A latch element or hook 40c is fixed to the handle as best shown in FIG. 5 and is designed to engage a roller element 41a mounted on the end of arm 41 remote from the connecting hinge 42.

The position of the latch roller element 41a may be adjusted by any suitable means (not shown) to vary the precise position of the two clamping arms 40 and 41 when in latched position. A handle-engaging stop 41b is provided to position the end of the handle 40a and in the form shown, the handle may be passed over the center line between the two hinge pins 42 and 40b; however, this over-center locking action may be found to be undesirable and this can be eliminated by appropriate adjustment of the position of the stop 41b and the latch roller 41a.

A central portion of the upper lever arm 40 has a deflecting element 50 connected therewith by a calibrated strain gauge beam member 55 which is connected at its ends to said arm 40 as by a supporting cone or yoke structure 56 and supporting brackets 57. The deflecting element 50 is mounted on the beam 55 by a pair of connecting elements such as the tie bars 58 centered on the beam 55 by suitable spaced notches 55a in the bottom of the beam.

Figure 6:
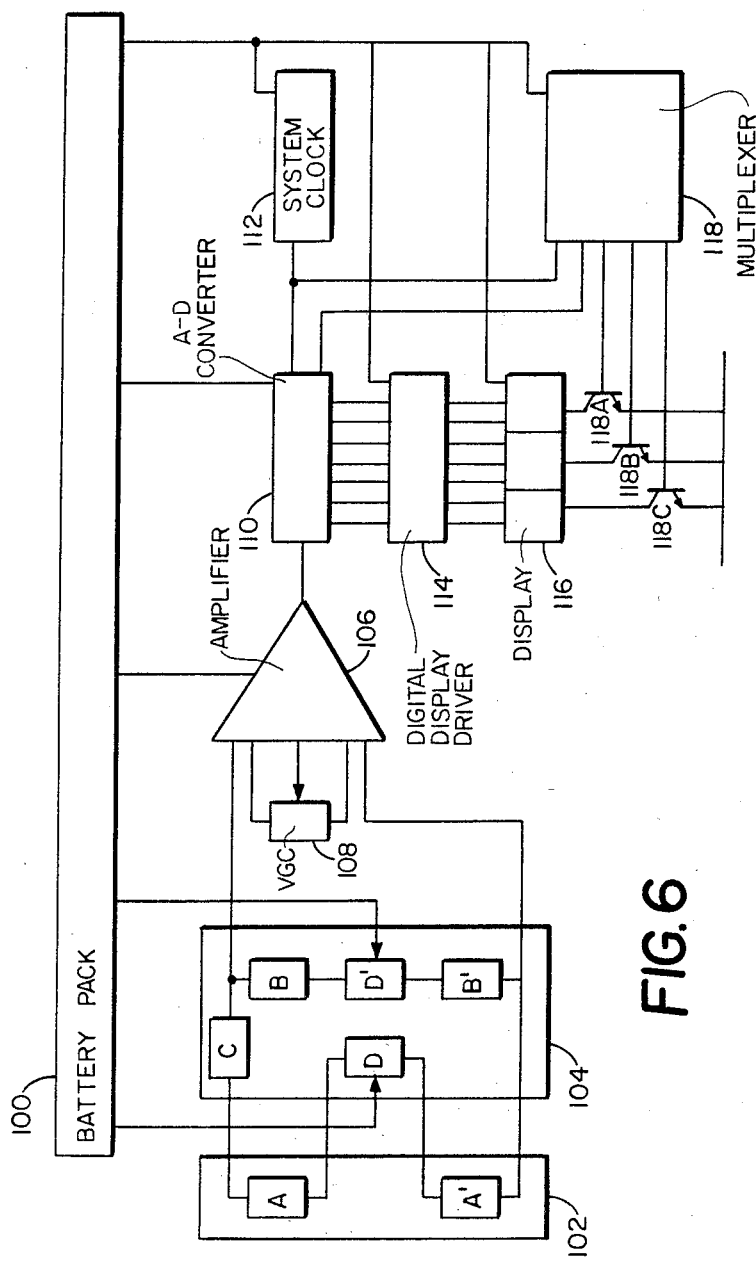
FIG. 6 is a block circuit diagram showing a typical circuit for producing the desired readout display.

Strain gauge sensing elements 60 and 61 are connected to suitable conventional circuitry such as shown in the block diagram FIG. 6 designed and calibrated to produce a visual readout or display 62 showing the tension factor produced by the strings.

The racket testing device can be converted to a ball compressibility testing device as best shown in FIG. 5 by inserting a ball such as a tennis ball into the cup 45a formed in the base unit 45. The deflecting element 50 is also provided with an aligned recess to receive the upper portion of the ball and produce the compression illustrated by the full lines in FIG. 5. Since the circuitry for determining the force required to compress the tennis ball may require a different calibration from the circuitry to provide the tension reading for the strings 12, a ball-engaging micro switch 50a may be mounted in the upper cup of the deflecting element 50 and convert the electrical circuitry (not shown) to produce the desired direct reading ball compressibility factor instead of the string tension factor reading. The lower lever arm 41 is designed to provide a stable supporting base with the bottom of the ring member 45 as shown in the bottom platform 41c provided at the rear end of the lower lever arm 41.

The force required to compress tennis balls may be shown as a compressibility factor, i.e. the compressibility factor of a new, fully pressurized ball may be read out as a rating number of 100–105, for example. Since the force required to compress a used or under-pressurized ball will be less, the balls compressibility factor will be less. Thus, a new or used ball can be checked by the device to determine its compressibility factor and, therefore, its suitability for play.

It will be apparent that in all forms of the racket tension-determining or ball compressibility-determining apparatus disclosed herein, the determination of the tension factor or compressibility factor is dependent upon two measurement components—a deflection component and a force component. The resistive force of the strings resulting from a measured deflection component can be converted to a string tension factor which may or may not be the actual tension in the strings such as is produced by conventional racket-stringing machines at the time the racket is strung.

The circuitry shown in FIG. 6 provides a means for electronically sensing and subsequently displaying the results of the mechanical movement of the deflected racket strings and can be used in all forms of the invention disclosed.

A suitable power source is provided such as a battery pack 100. Component 102 is a force-sensing unit such as the strain gauge elements 30–31, 36, and 60–61. These elements are represented as A and A' in FIG. 6 and are bonded to the beam or bar which produces a length variation in response to the force applied to deflect the racket strings as previously described. The strain gauge elements A and A' change in electrical resistance in response to said length variation.

Component 104 is a resistive assembly that works in conjunction with the strain sensing component 102 to form an electronic bridge which develops an output voltage representative of bar or beam length variation as sensed by the strain gauges.

Resistors B and B' are of appropriate resistance for components A and A'. Resistors D and D' provide a balancing or zeroing means for the bridge circuit. C is a temperature-compensating means which may be provided to nullify the effect of temperature changes on the components.

The output voltage developed by the electronic bridge is applied to the analog voltage amplifier 106 to raise the small bridge output voltage to a more usable level.

A suitable calibration control such as a variable gain control 108 is provided to produce reproducible results with all system elements by modifying the gain of the 106 amplifier.

The output from amplifier 106 is applied to the analog-to-digital converter 110 (A-D converter). This converter 110 changes the analog input voltage to a representative parallel digital form. This is the central means for providing a digital visual display from the analog voltage produced by the sensing bridge components 102-104.

The output from the A-D converter 110 is applied to a display driver 114. This driver 114 supplies sufficient power to drive the visual digital display 116.

The 116 visual digital display provides the means for observing a force representation of the deflection of the racket strings.

A system clock 112 provides timed digital pulses utilized by the A-D converter 110 and a multiplexer 118, and synchronizes the digital display driver 114 to the operation of the A-D converter 110.

The multiplexer 118 reduces the requirements for the display driver 114 by sequentially switching each digit of the 116 display as the digit information is output by the 110 A-D converter under control of the 112 system clock. Transistors 118A, 118B, and 118C provide the switching means to interface the 118 multiplexer with the display 116.

In the event that the device is to be used to determine the deflection in the game balls, the switch 50a may be provided if necessary in cooperation with parallel circuit components (not shown) which would be capable of operating within the range required for determining the compressibility of the balls. This could readily be done by using a calibration control component similar to the variable gain control 108 but operating within the required range limits for determining the compressibility of the ball.

It is to be understood that while there has been illustrated and described certain forms of the present invention, the invention is not to be limited to the specific form or arrangement of parts herein described and shown except to the extent that such limitations are found in the claims.

What is claimed is:

1. A device for determining the tension factor in a grid, said device having in combination, a frame structure defining a predetermined test area and adapted to be mounted on a first side of the grid in contact therewith, means for producing two measurement components, comprising a deflection component and a force component, application means for applying one of said measurement components to the defined test area of the grid on the second side of the grid, sensing means for sensing the value of the other measurement component resulting from the application of the first component, and means for producing from the values of the two components the tension factor in the elements forming the grid.

2. The structure set forth in claim 1 wherein the application means for applying said one measurement component constitutes a deflection producing mechanism, and the sensing means constitutes an electronic load cell assembly for sensing the force component and calibrated electronic circuity for producing the tension factor in the grid elements.

3. The structure set forth in claim 2 and display means for permitting the direct reading of the tension factor in the grid elements.

4. The structure set forth in claim 1 and ball-supporting means mounted on said frame structure and said application means to support a ball inserted between the frame structure and the application means to permit the compressibility of a ball to be sensed by said sensing means.

5. A device for determining the tension factor in a grid formed by the strings of a racket, said device comprising, a generally annular frame structure adapted to be mounted in engagement with a first side of the racket strings to define a predetermined test area within the area of the racket face, a string deflecting element removably connected with said frame structure for engagement with the second side of the strings of said racket, means for moving the deflecting element against the back-up force exerted by the frame structure in engagement with the first side of the racket strings to produce an increment of deflection of the strings within the test area, and means for measuring the force exerted by the strings during by said deflection.

6. The structure set forth in claim 5 and the connection formed between the deflecting element and the frame structure comprising, a spindle connected at one end to said frame structure and the other end to said deflecting element an extending through the strings of the grid to permit the deflecting element to be attached thereto on the second side of the racket strings when the frame structure has been positioned on the first side of said grid.

7. The structure set forth in claim 6 wherein said spindle is slidably mounted on said frame structure and said means for moving the deflecting element works in a direction normal to the plane defined by the strings, 8. The structure set forth in claim 5 wherein the force-measuring means consists in an electronic load cell including a strain gauge calibrated to produce a signal proportional to the force exerted by the strings when the same are deflected by said deflecting element.

9. The structure set forth in claim 5 and a pair of pivotally-connected arms of sufficient length to traverse a portion of the width of a racket head and extend therebeyond, wherein the annular frame structure is mounted on one arm and the string-deflecting element is mounted on the other arm in opposed relation to the frame structure, and the means for moving the deflecting element comprising a handle portion connected to one of said arms to move the two arms into predetermined closed position.

10. The structure set forth in claim 9 and an overcenter clamping linkage for holding the handle portion in clamped position.

11. The structure set forth in claim 9 and stop means for preventing the handle portion from moving into overcenter, locked position.

* * * * *